(12) United States Patent
Baykal et al.

(10) Patent No.: US 12,524,653 B2
(45) Date of Patent: Jan. 13, 2026

(54) METHOD AND SYSTEM FOR EFFICIENT LEARNING ON LARGE MULTIPLEX NETWORKS

(71) Applicant: JPMorgan Chase Bank, N.A., New York, NY (US)

(72) Inventors: Cenk Baykal, Cambridge, MA (US); Vamsi Krishna Potluru, New York, NY (US); Sameena Shah, Scarsdale, NY (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1026 days.

(21) Appl. No.: 17/648,894

(22) Filed: Jan. 25, 2022

(65) Prior Publication Data

US 2023/0237315 A1 Jul. 27, 2023

(51) Int. Cl.
G06N 3/047 (2023.01)
G06N 3/10 (2006.01)

(52) U.S. Cl.
CPC ............... *G06N 3/047* (2023.01); *G06N 3/10* (2013.01)

(58) Field of Classification Search
CPC .................................. G06N 3/047; G06N 3/10
See application file for complete search history.

(56) References Cited

U.S. PATENT DOCUMENTS

2019/0251480 A1* 8/2019 Garcia Duran ........ G06N 20/20

OTHER PUBLICATIONS

Zou et al. (Layer-Dependent Importance Sampling for Training Deep and Large Graph Convolutional Neural Networks, Nov. 2019, pp. 1-15) (Year: 2019).*
Liu et al. (Bandit Samplers for Training Graph Neural Networks, Jun. 2020, pp. 1-18) (Year: 2020).*
Zhang et al. (A Biased Graph Neural Network Sampler with Near-Optimal Regret, Nov. 2021, pp. 1-25) (Year: 2021).*
Grassia et al. (mGNN: Generalizing the Graph Neural Networks to the Multilayer Case, Sep. 2021, pp. 1-10) (Year: 2021).*
Montavon et al. (Layer-Wise Relevance Propagation: An Overview, Jul. 2019, pp. 193-209) (Year: 2019).*
Guo et al. (Domain Generalization via Progressive Layer-wise and Channel-wise Dropout, Dec. 2021, pp. 1-12) (Year: 2021).*

* cited by examiner

*Primary Examiner* — George Giroux
(74) *Attorney, Agent, or Firm* — GREENBLUM & BERNSTEIN, P.L.C.

(57) ABSTRACT

A method for using a graph neural network framework to improve learning and predicting in a multiplex network environment is provided. The method includes: identifying a plurality of layers of a multiplex network; estimating, for each layer, a corresponding probability of selecting the layer as being a relevant layer for training with respect to an application; estimating, for each layer, a corresponding loss associated with selecting the layer as being relevant; calculating, for each layer based on the corresponding probability and the corresponding loss, a corresponding regret associated with selecting the layer as being relevant; determining, for each layer based on the calculated corresponding regret, whether to select the layer as being relevant; and training the multiplex network with respect to the application by aggregating information obtained from layers that have been determined as being relevant layers.

17 Claims, 4 Drawing Sheets

METHOD AND SYSTEM FOR EFFICIENT LEARNING ON LARGE MULTIPLEX NETWORKS

BACKGROUND

1. Field of the Disclosure

This technology generally relates to methods and systems for using graph neural networks to perform node classification and link prediction tasks, and more particularly to methods and systems for using a graph neural network framework to effect efficient learning on large multiplex networks with a large number of layers in order to improve performance with respect to node classification and link prediction tasks.

2. Background Information

Graph Neural Networks (GNNs) have been unprecedentedly successful in many high-impact applications, ranging from drug discovery to financial and social network analyses. Most of the prior work on GNNs has focused on the monoplex setting, where access to a network is available with only a single type of connection between entities. However, in many real-world settings, two nodes may be connected in more than one way. For example, a person may be a part of various social networks such as Facebook, Twitter, and/or Instagram, among others. In this case, the person's connections on, e.g., Facebook, may reveal information about their connections on other platforms, and more generally, be intricately linked with their graphical connectivity on other platforms. A multiplex network is a representation of such connectivity.

A multiplex network is composed of multiple layers, i.e., sub-networks where only one type of connection is present. In the context of the previous example, the Facebook network is a single layer of the multiplex network. The multiple layers (Facebook, Twitter, Instagram) then constitute the multiplex as a whole. Given the increasing need to model and learn from these intricate connections, the question of how to best model and train multiplexes has recently gained significant interest. This question is further motivated by the immense computational complexity of learning on graphs comprised of multiple sub-networks, each of which is computationally intensive to train in itself.

Earlier works have focused on the problem of computationally-efficient link prediction in the multiplex setting. In particular, some prior work in scalable training multiplex networks includes Multiplex Network Embedding (MNE) and DeePlex, which are described below.

MNE: In MNE, the idea is to learn a base embedding that utilizes information regarding all the links in all the sub-networks and individual node embeddings for each of the layers. Concretely, given a network of layers $G_1, \ldots, G_L$ where there are L layers and $G_i=(N_i,E_i)$ corresponding to sets of $N_i$ nodes and $E_i$ edges, MNE learns a node embedding:

$$v_n^i = b_n + w^i {X^i}^T u_n^i \tag{1}$$

where $X^i \in R^{s \times d}$, $b_n$ corresponds to the base node embedding and $u_n^i$ corresponds to the individual node embedding for the layer. The matrices $X^i$ account for the high-dimensional global embeddings with the lower dimensional individual embeddings. The model is learned by utilizing random walks on each layer type to generate a sequence of nodes, and then a skip-gram algorithm is used to learn the embeddings. Although MNE has been highly successful in various real-world data sets, it is not able to handle multiplexes with many layers in a computationally efficient way because it aggregates information over all layers—including those that may not be relevant for the layer under consideration.

DeePlex: Aggregating information across all the layers as in MNE not only necessitates training all of the layers at each time step, but also incorporating the dense embeddings of all other layers in training a model such as a feed-forward neural network. This means that a larger number of model parameters must be learned due to the increase in the input size to the networks. To overcome this shortcoming, DeePlex considers sampling k-nearest layers for a suitably chosen k while training the network. The premise of this approach is that not all layers will be relevant for the current layer's embedding, and those layers whose embeddings are most similar to the current one should be sampled. A Neural Sort operator may be used to obtain a continuous relaxation of the output of a sorting operator, and subsequently to train the network and the sorting operator in the standard way to learn both the architecture and the sorted order of neighboring layers.

DeePlex has shown promise as a scalable approach for multiplexes. However, the main focus of DeePlex has been on the inference-time complexity, as opposed to predicting at a layer without utilizing all of the embedding information from the entire multiplex network. Additionally, DeePlex suffers from the computational complexity of learning a k-nearest layers model for each layer, which can be prohibitively expensive when the number of layers is large.

SUMMARY

The present disclosure, through one or more of its various aspects, embodiments, and/or specific features or sub-components, provides, inter alia, various systems, servers, devices, methods, media, programs, and platforms for using a graph neural network framework to effect efficient learning on large multiplex networks with a large number of layers in order to improve performance with respect to node classification and link prediction tasks.

According to an aspect of the present disclosure, a method for using a graph neural network framework to improve learning and predicting in a multiplex network environment is provided. The method is implemented by at least one processor. The method includes: identifying, by the at least one processor, a plurality of layers of a multiplex network; estimating, by the at least one processor, for each respective layer from among the plurality of layers, a corresponding probability of selecting the respective layer as being a relevant layer for training with respect to a predetermined application; estimating, by the at least one processor, for each respective layer from among the plurality of layers, a corresponding loss associated with selecting the respective layer as being a relevant layer for training with respect to the predetermined application; calculating, by the at least one processor, for each respective layer from among the plurality of layers and based on the corresponding probability and the corresponding loss, a corresponding regret associated with selecting the respective layer as being a relevant layer for training with respect to the predetermined application; and determining, by the at least one processor, for each respective layer from among the plurality of layers and based on the calculated corresponding regret, whether to select the respective layer as being a relevant layer for training with respect to the predetermined application.

The method may further include training the multiplex network with respect to the predetermined application by aggregating information obtained from layers that have been determined as being relevant layers.

The calculating of the corresponding regret may include calculating a difference between a probability distribution associated with selecting the respective layer and an optimal probability distribution.

The estimating of the corresponding loss may include estimating a Euclidean distance between embeddings included in the respective layer and embeddings included in at least one neighboring layer.

The calculating of the corresponding regret may include calculating an upper bound for the corresponding regret.

The determining of whether to select the respective layer as a relevant layer may include comparing the calculated upper bound for the corresponding regret with a predetermined threshold value.

The determining of whether to select the respective layer as a relevant layer may include selecting a predetermined number of respective layers having relatively lower calculated upper bound values.

According to another aspect of the present disclosure, a computing apparatus for using a graph neural network framework to improve learning and predicting in a multiplex network environment is provided. The computing apparatus includes a processor; a memory; and a communication interface coupled to each of the processor and the memory. The processor is configured to: identify a plurality of layers of a multiplex network; estimate, for each respective layer from among the plurality of layers, a corresponding probability of selecting the respective layer as being a relevant layer for training with respect to a predetermined application; estimate, for each respective layer from among the plurality of layers, a corresponding loss associated with selecting the respective layer as being a relevant layer for training with respect to the predetermined application; calculate, for each respective layer from among the plurality of layers and based on the corresponding probability and the corresponding loss, a corresponding regret associated with selecting the respective layer as being a relevant layer for training with respect to the predetermined application; and determine, for each respective layer from among the plurality of layers and based on the calculated corresponding regret, whether to select the respective layer as being a relevant layer for training with respect to the predetermined application.

The processor may be further configured to train the multiplex network with respect to the predetermined application by aggregating information obtained from layers that have been determined as being relevant layers.

The processor may be further configured to calculate the corresponding regret by calculating a difference between a probability distribution associated with selecting the respective layer and an optimal probability distribution.

The processor may be further configured to estimate the corresponding loss by estimating a Euclidean distance between embeddings included in the respective layer and embeddings included in at least one neighboring layer.

The processor may be further configured to calculate the corresponding regret by calculating an upper bound for the corresponding regret.

The processor may be further configured to determine whether to select the respective layer as a relevant layer by comparing the calculated upper bound for the corresponding regret with a predetermined threshold value.

The processor may be further configured to determine whether to select the respective layer as a relevant layer by selecting a predetermined number of respective layers having relatively lower calculated upper bound values.

According to yet another aspect of the present disclosure, a non-transitory computer readable storage medium storing instructions for using a graph neural network framework to improve learning and predicting in a multiplex network environment is provided. The storage medium includes executable code which, when executed by a processor, causes the processor to: identify a plurality of layers of a multiplex network; estimate, for each respective layer from among the plurality of layers, a corresponding probability of selecting the respective layer as being a relevant layer for training with respect to a predetermined application; estimate, for each respective layer from among the plurality of layers, a corresponding loss associated with selecting the respective layer as being a relevant layer for training with respect to the predetermined application; calculate, for each respective layer from among the plurality of layers and based on the corresponding probability and the corresponding loss, a corresponding regret associated with selecting the respective layer as being a relevant layer for training with respect to the predetermined application; and determine, for each respective layer from among the plurality of layers and based on the calculated corresponding regret, whether to select the respective layer as being a relevant layer for training with respect to the predetermined application.

The executable code may be further configured to cause the processor to train the multiplex network with respect to the predetermined application by aggregating information obtained from layers that have been determined as being relevant layers.

The executable code may be further configured to cause the processor to calculate the corresponding regret by calculating a difference between a probability distribution associated with selecting the respective layer and an optimal probability distribution.

The executable code may be further configured to cause the processor to estimate the corresponding loss by estimating a Euclidean distance between embeddings included in the respective layer and embeddings included in at least one neighboring layer.

The executable code may be further configured to cause the processor to calculate the corresponding regret by calculating an upper bound for the corresponding regret.

The executable code may be further configured to cause the processor to determine whether to select the respective layer as a relevant layer by comparing the calculated upper bound for the corresponding regret with a predetermined threshold value.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
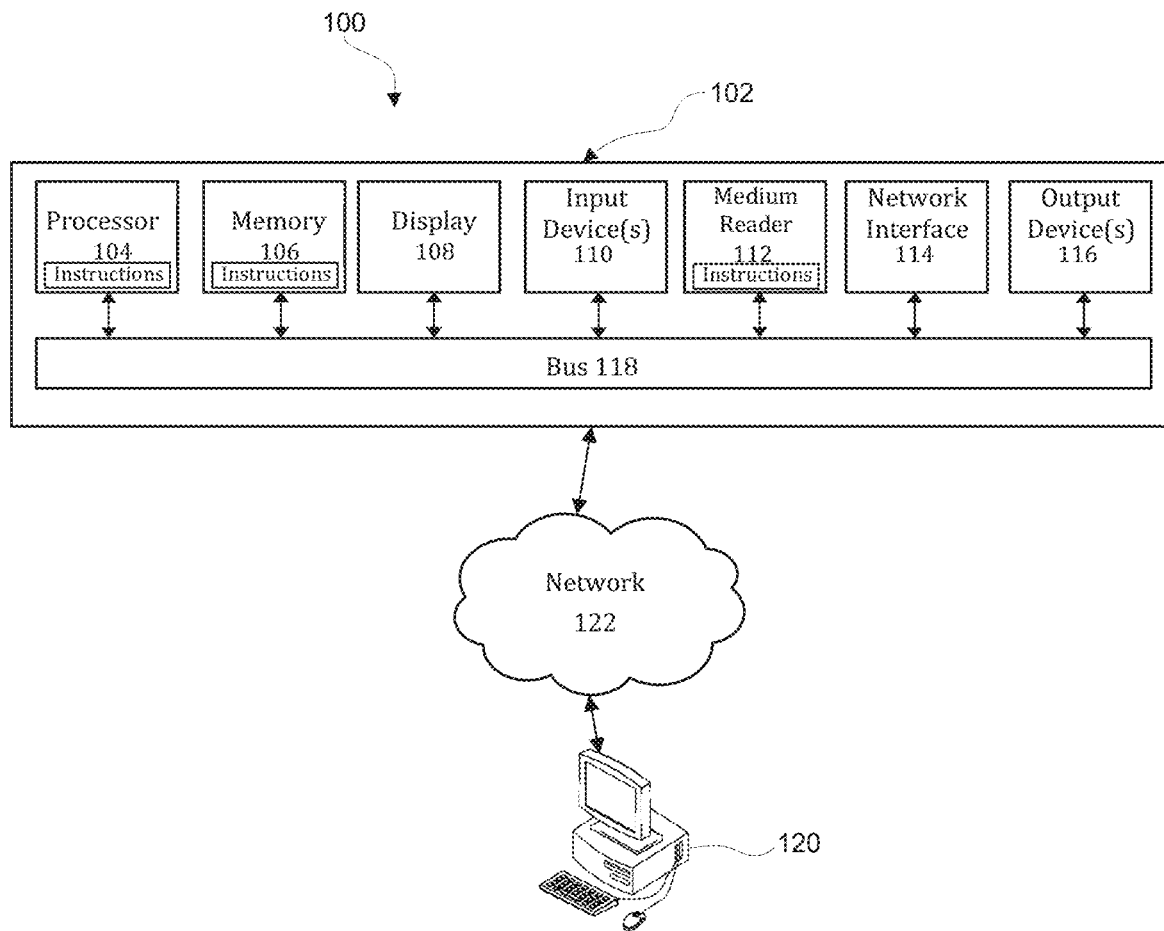
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a graph neural network framework to effect efficient learning on large multiplex networks with a large number of layers in order to improve performance with respect to node classification and link prediction tasks.

Figure 2:
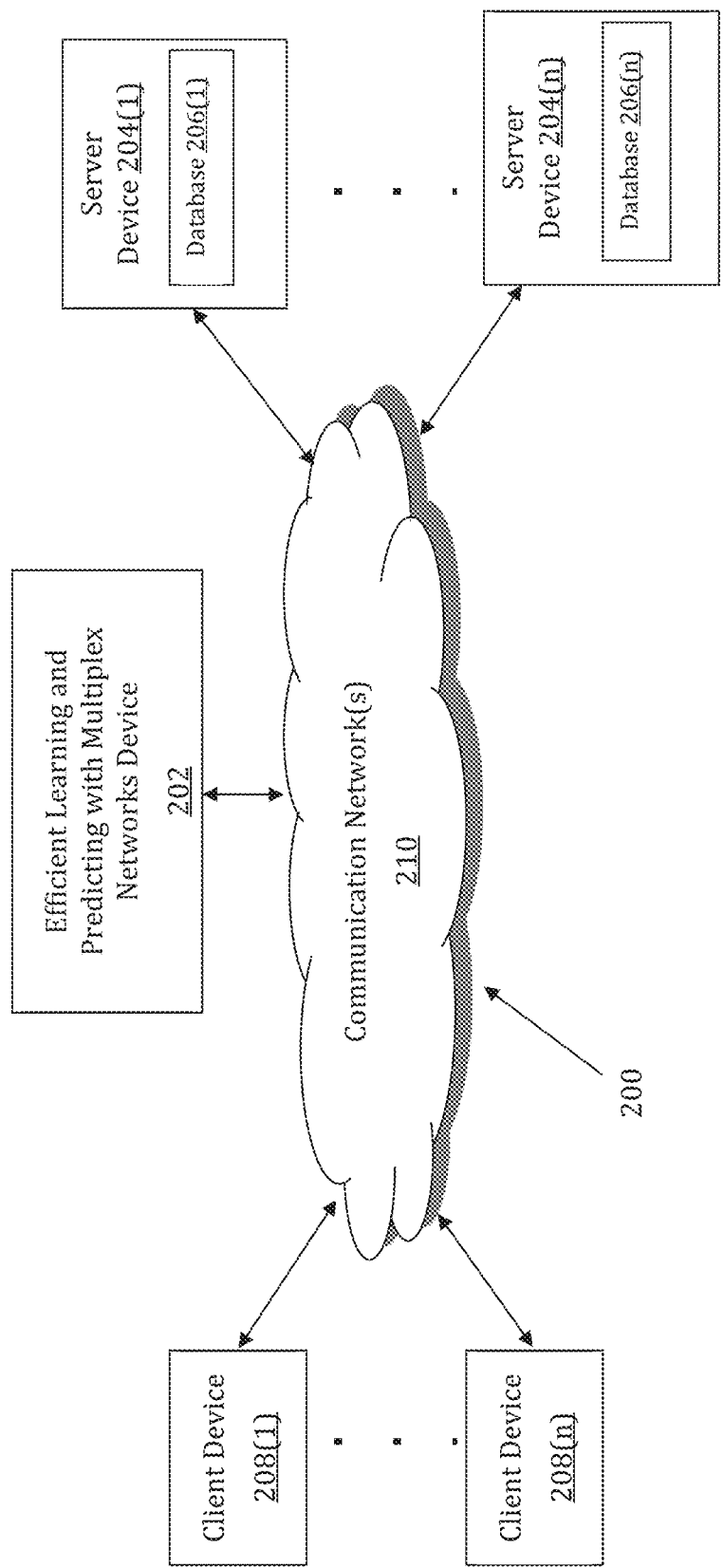
FIG. 2 illustrates an exemplary diagram of a network environment.

Referring to FIG. 2, a schematic of an exemplary network environment 200 for implementing a method for using a graph neural network framework to effect efficient learning on large multiplex networks with a large number of layers in order to improve performance with respect to node classification and link prediction tasks is illustrated. In an exemplary embodiment, the method is executable on any networked computer platform, such as, for example, a personal computer (PC).

The method for using a graph neural network framework to effect efficient learning on large multiplex networks with a large number of layers in order to improve performance with respect to node classification and link prediction tasks may be implemented by an Efficient Learning and Predicting with Multiplex Networks (ELPMN) device 202. The ELPMN device 202 may be the same or similar to the computer system 102 as described with respect to FIG. 1. The ELPMN device 202 may store one or more applications that can include executable instructions that, when executed by the ELPMN device 202, cause the ELPMN device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ELPMN device 202 itself, may be located in virtual server(s) running in a cloud-based computing environment rather than being tied to one or more specific physical network computing devices. Also, the application(s) may be running in one or more virtual machines (VMs) executing on the ELPM device 202. Additionally, in one or more embodiments of this technology, virtual machine(s) running on the ELPMN device 202 may be managed or supervised by a hypervisor.

In the network environment 200 of FIG. 2, the ELPMN device 202 is coupled to a plurality of server devices 204(1)-204(n) that hosts a plurality of databases 206(1)-206(n), and also to a plurality of client devices 208(1)-208(n) via communication network(s) 210. A communication interface of the ELPMN device 202, such as the network interface 114 of the computer system 102 of FIG. 1, operatively couples and communicates between the ELPMN device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ELPMN device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ELPMN devices that efficiently implement a method for using a graph neural network framework to effect efficient learning on large multiplex networks with a large number of layers in order to improve performance with respect to node classification and link prediction tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ELPMN device 202 may be a standalone device or integrated with one or more other devices or apparatuses, such as one or more of the server devices 204(1)-204(n), for example. In one particular example, the ELPMN device 202 may include or be hosted by one of the server devices 204(1)-204(n), and other arrangements are also possible. Moreover, one or more of the devices of the ELPMN device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ELPMN device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to applications included in a multiplex network and known links among entities within a particular social network.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ELPMN device 202 via communication network(s) 210. Accordingly, the client devices 208(1)-208(n) may be mobile computing devices, desktop computing devices, virtual computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ELPMN device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ELPMN device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ELPMN device 202, the server devices 204(1)-204(n), or the client devices 208(1)-208(n), for example, may be configured to operate as virtual instances on the same physical machine. In other words, one or more of the ELPMN device 202, the server devices 204(1)-204(n), or the client devices 208(1)-208(n) may operate on the same physical device rather than as separate devices communicating through communication network(s) 210. Additionally, there may be more or fewer ELPMN devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
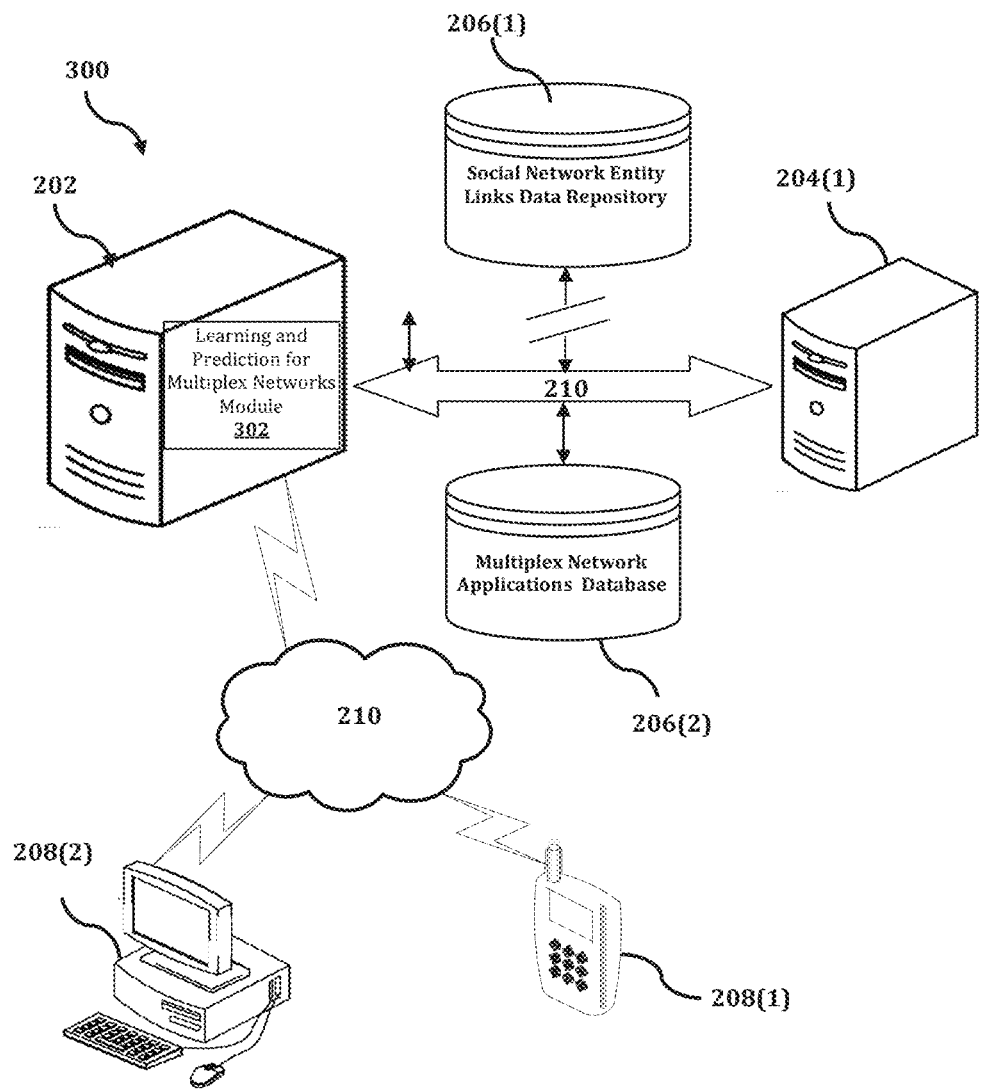
FIG. 3 shows an exemplary system for implementing a method for using a graph neural network framework to effect efficient learning on large multiplex networks with a large number of layers in order to improve performance with respect to node classification and link prediction tasks.

The ELPMN device 202 is described and illustrated in FIG. 3 as including a learning and prediction for multiplex networks module 302, although it may include other rules, policies, modules, databases, or applications, for example. As will be described below, the learning and prediction for multiplex networks module 302 is configured to implement a method for using a graph neural network framework to effect efficient learning on large multiplex networks with a large number of layers in order to improve performance with respect to node classification and link prediction tasks.

An exemplary process 300 for implementing a mechanism for using a graph neural network framework to effect efficient learning on large multiplex networks with a large number of layers in order to improve performance with respect to node classification and link prediction tasks by utilizing the network environment of FIG. 2 is illustrated as being executed in FIG. 3. Specifically, a first client device 208(1) and a second client device 208(2) are illustrated as being in communication with ELPMN device 202. In this regard, the first client device 208(1) and the second client device 208(2) may be "clients" of the ELPMN device 202 and are described herein as such. Nevertheless, it is to be known and understood that the first client device 208(1) and/or the second client device 208(2) need not necessarily be "clients" of the ELPMN device 202, or any entity described in association therewith herein. Any additional or alternative relationship may exist between either or both of the first client device 208(1) and the second client device 208(2) and the ELPMN device 202, or no relationship may exist.

Further, ELPMN device 202 is illustrated as being able to access a social network entity links data repository 206(1) and a multiplex network applications database 206(2). The learning and prediction for multiplex networks module 302 may be configured to access these databases for implementing a method for using a graph neural network framework to effect efficient learning on large multiplex networks with a large number of layers in order to improve performance with respect to node classification and link prediction tasks.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ELPMN device 202 via broadband or cellular communication. Of course, these embodiments are merely exemplary and are not limiting or exhaustive.

Upon being started, the learning and prediction for multiplex networks module 302 executes a process for using a graph neural network framework to effect efficient learning on large multiplex networks with a large number of layers in order to improve performance with respect to node classification and link prediction tasks. An exemplary process for using a graph neural network framework to effect efficient learning on large multiplex networks with a large number of layers in order to improve performance with respect to node classification and link prediction tasks is generally indicated at flowchart 400 in FIG. 4.

Figure 4:
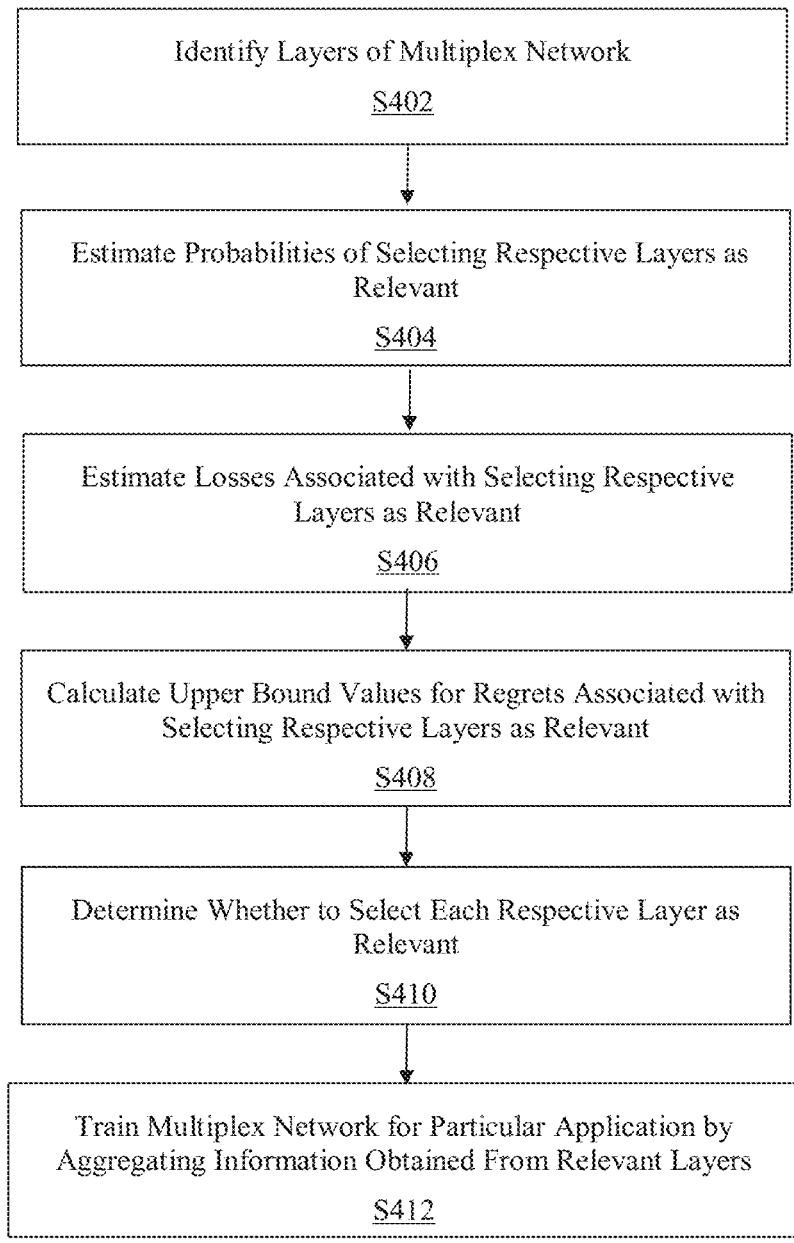
FIG. 4 is a flowchart of an exemplary process for implementing a method for using a graph neural network framework to effect efficient learning on large multiplex networks with a large number of layers in order to improve performance with respect to node classification and link prediction tasks.

In process 400 of FIG. 4, at step S402, the learning and prediction for multiplex networks module 302 identifies a plurality of layers of a multiplex network. In an exemplary embodiment, the multiplex network is implemented as a graph neural network.

At step S404, the learning and prediction for multiplex networks module 302 estimates, for each respective layer identified in step S402, a corresponding probability of selecting the respective layer as being a relevant layer for training with respect to a predetermined application.

At step S406, the learning and prediction for multiplex networks module 302 estimates, for each respective layer identified in step S402, a corresponding loss associated with selecting the respective layer as being a relevant layer for training with respect to the predetermined application. In an exemplary embodiment, the estimation of the loss may be performed by estimating a Euclidean distance between embeddings included in the respective layer and embeddings included in at least one neighboring layer of the multiplex network.

At step S408, the learning and prediction for multiplex networks module 302 calculates, for each respective layer identified in step S402, a corresponding regret associated with selecting the respective layer as being a relevant layer for training with respect to the predetermined application. In this aspect, regret may be understood as referring to comparing the selection of a particular layer as being relevant with the best possible set of selections of relevant layers with the benefit of hindsight. Accordingly, in an exemplary embodiment, for a given layer, the calculation of the regret may be performed by calculating a difference between a probability distribution associated with selecting the given layer and an optimal probability distribution.

The calculation of a precise value for the regret with respect to a particular layer may be difficult as a practical matter. For this reason, in an exemplary embodiment, for each respective layer, the calculation of the corresponding regret may include calculating an upper bound for the corresponding regret.

At step S410, the learning and prediction for multiplex networks module 302 determines, for each respective layer identified in step S402, whether or not to select the respective layer as being a relevant layer for training with respect to the predetermined application. In an exemplary embodiment, the determination as to relevancy may be made based on whether the calculated upper bound for the corresponding regret exceeds a predetermined threshold value. Alternatively, the determination as to relevancy may be made based on selecting a predetermined number of layers that have the lowest upper bound values among the complete set of layers identified in step S402.

At step S412, the learning and prediction for multiplex networks module 302 trains the multiplex network with respect to the predetermined application by aggregating information obtained from the layers that have been selected as being relevant layers in step S410. In an exemplary embodiment, this aggregation of information is significantly less voluminous that it would otherwise be by virtue of the selection of the relevant layers, and is also optimized for utility and accuracy by virtue of the determinations regarding relevancy.

Graph neural networks have gained prominence due to their excellent performance in many classification and prediction tasks. In particular, they are used for node classification and link prediction which have a wide range of applications in social networks, biomedical datasets and financial transaction graphs. Most prior work has focused primarily on the monoplex setting, where access to a network is available with only a single type of connection between entities. However, in the multiplex setting, where there are multiple types of connections, or layers, between entities, performance on tasks such as link prediction has been shown to be stronger when information from other connection types is taken into account. The present disclosure provides a description of an efficient learning on large multiplex networks with a large number of layers. In an exemplary embodiment, the efficiency of the method disclosed herein is enabled by an online learning algorithm that learns how to sample relevant neighboring layers so that only the layers with relevant information are aggregated during training. This sampling differs from prior work, such as MNE, which aggregates information across all layers and consequently leads to computational intractability on large networks. This approach also improves on the recent layer sampling method of DeePlex in that the unsampled layers do not need to be trained, thus enabling further increases in efficiency.

The present disclosure focuses on increasing the efficiency of training and predicting with multiplex networks via adaptive sampling of the relevant layers. In particular, an online learning algorithm for each layer that adaptively learns a sampling distribution over the neighboring layers is used. This approach selectively hones in on the information from relevant layers, rather than the full set of information available, in order to increase efficiency in both training and inference. Moreover, this approach does not require learning a k-nearest layers model for each layer, and hence is applicable during training even for a multiplex with a large number of layers.

In particular, the present disclosure provides 1) a formulation of the multiplex layer sampling problem as an online learning problem with partial information; and 2) an algorithm for adaptive identification and sampling of important layers of a multiplex network for multiplex training.

Problem Definition: Consider a multiplex network G with L layers (i.e., subnetworks). This means that for any layer i ∈ [L], layer i has n=L−1 neighboring nodes whose embedding information can be used towards learning the embedding of layer l at each time step t. Suppose we have $T \in N_+$ training time steps. The embedding of each (t) layer j ∈ [L] at each time step t ∈ [T] is denoted as $v_j^{(t)}$.

For a fixed layer i ∈ [L], consider the problem of sampling k relevant layers at each time step of the training. Subsequently, this procedure will be extended for sampling neighbors of all L layers. Here, it is assumed that at time step t ∈ [T], the relevancy of a neighboring layer j ∈ [n] can be quantified by a loss $\ell_j^{(t)} \geq 0$. The smaller the loss, the more relevant the layer j towards the embedding of layer i under consideration. Under this general setting, the question is what should the sampling distribution of the neighboring layers be so that only the relevant layers are considered. Unfortunately, this leads to the chicken and the egg problem: knowing which layers are relevant is not possible until they are sampled and trained, but is also not possible to sample and train layers without knowing which layers are relevant to the current layer.

This dilemma is known as the exploration-exploitation trade-off and has been well-studied in the multi-armed bandits and online learning with partial information settings. Here, one way to resolve this interdependence is to formulate the problem as one of minimizing regret relative to the best action that could have been taken in hindsight. Hence, in the context of the setting above, it is desirable to generate a sequence of probability distributions at each time step ($p_1$, ..., $p_T$) such that the regret relative to the best distribution in hindsight is minimized:

$$\text{Regret}(\{p_t\}) = \sum_\tau \langle p_\tau, \ell_\tau \rangle - \min_{p \in \Delta} \sum_\tau \langle p_\tau, \ell_\tau \rangle, \qquad (2)$$

where $\Delta = \{p \in [0,1]^n : P_{k \in [n]} p_k = 1\}$ is the probability simplex over the neighboring layers.

Method: Multi-armed Bandits (MAB) and online learning with partial information literature is rich with algorithms that attempt to minimize the regret expressed in Equation 2 above. Hence, as part of a first attempt to solving the problem, the similarity between the layers is defined with respect to the Euclidean distance between their embeddings, i.e., for sampling the neighbors of layer i ∈ [L], the loss of a neighboring layer j ∈ [n] at time step t is given by $$\ell_j^{(t)} = \|v_i^{(t)} - v_j^{(t)}\| \forall j \in [b]$$

Note that this loss is non-negative and yields a small loss for layers whose embeddings are more similar to that of the current layer as desired. At this point, it is tempting to simply apply one of the existing algorithms mentioned previously to minimize the regret. However, one issue is that virtually all of the prior work in taming the exploration-and-exploitation trade-off assumes that the losses are bounded in the interval [0,1], which is not guaranteed to be the case for the losses as defined above.

Although heuristics could be used to get around this limitation by capping the losses to be at most 1.0 and applying standard algorithms, this may yield bad results in practice (e.g., when all losses are greater than 1.0, they become indistinguishable after the capping). To overcome this, we take a more principled approach, by which the main idea is to adaptively update the value of a scaling factor E which essentially denotes the maximum value for the loss we have seen so far as a power of 2. The learning rate Tit is then scaled automatically and adaptively as a function of E and the variance of the losses seen thus far to account for this update. The result is an adaptive algorithm that scales to the range of losses seen in practice without having to know or specify this range beforehand.

Hence, the idea is to have a separate instance of Algorithm 1 (see below) for each layer of the network and update the sampling distribution accordingly as shown in Algorithm 1. This means that there will be L separate algorithm instances, one for each layer, that will learn the sampling distribution over the neighboring layers for that specific layer. It can then be shown that the bound on the regret defined by Equation 2 is given by Theorem 1 below:

Theorem 1. The regret of Algorithm 1 over T time steps is bounded by $$\text{Regret}(\{p_t\}) \leq \mathcal{O}(M\sqrt{nT \log n})$$

where $M = \max_{j \in [n]} \max^{t \in |T|} \ell_j^{(t)}$ and n is the number of layers to sample from.

| Algorithm 1 |
|---|
| 1:      $L \leftarrow \vec{0} \in R^n$ {Cumulative Loss}, <br>      $E \leftarrow 1$ {Loss scale}, $V \leftarrow 0$ {Cumulative variance} <br>      $\eta_0 \leftarrow 1$ {Learning Rate} |
| 2:      for each round $t \in [T]$ do |
| 3:          $p_{t,i} \leftarrow \exp(\eta_{t-1} L_i)$ for each $i \in [n]$ |
| 4:          $p_{t,i} \leftarrow p_{t,i}/P_{j \in A_t} p_{t,j}$ for all i {Normalize} |
| 5:          Random draw $i_t \sim p_t$ |
| 6:          Adversary reveals $\ell_{t,i_t}$ and we suffer loss $\ell_{t,i_t}$ |
| 7:          Construct unbiased estimate $\hat{\ell}_t$ <br>          $\forall i \in [n] \, \hat{\ell}_{t,i} \leftarrow \begin{cases} \ell_{t,i_t}/p_{t,i_t} & \text{if } i = i_t, \\ 0 & \text{otherwise} \end{cases}$ |
| 8:          $L \leftarrow L + \hat{\ell}$ |
| 9:          $E \leftarrow \max\{E, 2^k\}$ where $k = \lceil \log_2 (\|\hat{\ell}\|_\infty) \rceil$ |
| 10:        $V \leftarrow V + (\langle \hat{\ell}_t^2, p_t \rangle - \langle \hat{\ell}_t, p_t \rangle^2)$ |
| 11:        $\eta_t \leftarrow \min\{1/E, \sqrt{\log n/V}\}$ |
| 12:        end for |

Accordingly, with this technology, an optimized process for using a graph neural network framework to effect efficient learning on large multiplex networks with a large number of layers in order to improve performance with respect to node classification and link prediction tasks is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for using a graph neural network framework to improve learning and predicting in a multiplex network environment, the method being implemented by at least one processor, the method comprising:
   identifying, by the at least one processor, a plurality of layers of a multiplex network;
   estimating, by the at least one processor, for each respective layer from among the plurality of layers, a corresponding probability of selecting the respective layer as being a relevant layer for training with respect to a predetermined application;
   estimating, by the at least one processor, for each respective layer from among the plurality of layers, a corresponding loss associated with selecting the respective layer as being a relevant layer for training with respect to the predetermined application;
   calculating, by the at least one processor, for each respective layer from among the plurality of layers and based on the corresponding probability and the corresponding loss, a corresponding regret associated with selecting the respective layer as being a relevant layer for training with respect to the predetermined application; and
   determining, by the at least one processor, for each respective layer from among the plurality of layers and based on the calculated corresponding regret, whether to select the respective layer as being a relevant layer for training with respect to the predetermined application,
   wherein the estimating of the corresponding loss comprises estimating a Euclidean distance between embeddings included in the respective layer and embeddings included in at least one neighboring layer.

2. The method of claim 1, further comprising training the multiplex network with respect to the predetermined application by aggregating information obtained from layers that have been determined as being relevant layers.

3. The method of claim 1, wherein the calculating of the corresponding regret comprises calculating a difference between a probability distribution associated with selecting the respective layer and an optimal probability distribution.

4. The method of claim 1, wherein the calculating of the corresponding regret comprises calculating an upper bound for the corresponding regret.

5. The method of claim 4, wherein the determining of whether to select the respective layer as a relevant layer comprises comparing the calculated upper bound for the corresponding regret with a predetermined threshold value.

6. The method of claim 4, wherein the determining of whether to select the respective layer as a relevant layer comprises selecting a predetermined number of respective layers having relatively lower calculated upper bound values.

7. A computing apparatus for using a graph neural network framework to improve learning and predicting in a multiplex network environment, the computing apparatus comprising:
   a processor;
   a memory; and
   a communication interface coupled to each of the processor and the memory,
   wherein the processor is configured to:
      identify a plurality of layers of a multiplex network;
      estimate, for each respective layer from among the plurality of layers, a corresponding probability of selecting the respective layer as being a relevant layer for training with respect to a predetermined application;
      estimate, for each respective layer from among the plurality of layers, a corresponding loss associated with selecting the respective layer as being a relevant layer for training with respect to the predetermined application;
      calculate, for each respective layer from among the plurality of layers and based on the corresponding probability and the corresponding loss, a corresponding regret associated with selecting the respective layer as being a relevant layer for training with respect to the predetermined application; and
      determine, for each respective layer from among the plurality of layers and based on the calculated corresponding regret, whether to select the respective layer as being a relevant layer for training with respect to the predetermined application,
   wherein the processor is further configured to estimate the corresponding loss by estimating a Euclidean distance between embeddings included in the respective layer and embeddings included in at least one neighboring layer.

8. The computing apparatus of claim 7, wherein the processor is further configured to train the multiplex network with respect to the predetermined application by aggregating information obtained from layers that have been determined as being relevant layers.

9. The computing apparatus of claim 7, wherein the processor is further configured to calculate the corresponding regret by calculating a difference between a probability distribution associated with selecting the respective layer and an optimal probability distribution.

10. The computing apparatus of claim 7, wherein the processor is further configured to calculate the corresponding regret by calculating an upper bound for the corresponding regret.

11. The computing apparatus of claim 10, wherein the processor is further configured to determine whether to select the respective layer as a relevant layer by comparing the calculated upper bound for the corresponding regret with a predetermined threshold value.

12. The computing apparatus of claim 10, wherein the processor is further configured to determine whether to select the respective layer as a relevant layer by selecting a predetermined number of respective layers having relatively lower calculated upper bound values.

13. A non-transitory computer readable storage medium storing instructions for using a graph neural network framework to improve learning and predicting in a multiplex network environment, the storage medium comprising executable code which, when executed by a processor, causes the processor to:

identify a plurality of layers of a multiplex network;

estimate, for each respective layer from among the plurality of layers, a corresponding probability of selecting the respective layer as being a relevant layer for training with respect to a predetermined application;

estimate, for each respective layer from among the plurality of layers, a corresponding loss associated with selecting the respective layer as being a relevant layer for training with respect to the predetermined application;

calculate, for each respective layer from among the plurality of layers and based on the corresponding probability and the corresponding loss, a corresponding regret associated with selecting the respective layer as being a relevant layer for training with respect to the predetermined application; and determine, for each respective layer from among the plurality of layers and based on the calculated corresponding regret, whether to select the respective layer as being a relevant layer for training with respect to the predetermined application, wherein the executable code is further configured to cause the processor to estimate the corresponding loss by estimating a Euclidean distance between embeddings included in the respective layer and embeddings included in at least one neighboring layer.

14. The storage medium of claim 13, wherein the executable code is further configured to cause the processor to train the multiplex network with respect to the predetermined application by aggregating information obtained from layers that have been determined as being relevant layers.

15. The storage medium of claim 13, wherein the executable code is further configured to cause the processor to calculate the corresponding regret by calculating a difference between a probability distribution associated with selecting the respective layer and an optimal probability distribution.

16. The storage medium of claim 13, wherein the executable code is further configured to cause the processor to calculate the corresponding regret by calculating an upper bound for the corresponding regret.

17. The storage medium of claim 16, wherein the executable code is further configured to cause the processor to determine whether to select the respective layer as a relevant layer by comparing the calculated upper bound for the corresponding regret with a predetermined threshold value.

* * * * *